(12) United States Patent
Mizutani et al.

(10) Patent No.: US 7,960,885 B2
(45) Date of Patent: Jun. 14, 2011

(54) ROTOR AND METHOD OF MANUFACTURING THE ROTOR AND ELECTRIC VEHICLE

(75) Inventors: Tatsuhiko Mizutani, Toyota (JP);
Taketo Takeuchi, Nishio (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 94 days.

(21) Appl. No.: 12/450,176

(22) PCT Filed: Mar. 26, 2008

(86) PCT No.: PCT/JP2008/056530
§ 371 (c)(1),
(2), (4) Date: Sep. 15, 2009

(87) PCT Pub. No.: WO2008/132938
PCT Pub. Date: Nov. 6, 2008

(65) Prior Publication Data
US 2010/0026127 A1    Feb. 4, 2010

(30) Foreign Application Priority Data

Apr. 12, 2007 (JP) .................. 2007-104749

(51) Int. Cl.
*H02K 21/12* (2006.01)

(52) U.S. Cl. ................................. 310/156.53
(58) Field of Classification Search ............ 310/156.01, 310/156.53, 156.56, 156.21, 156.23
See application file for complete search history.

(56) References Cited

U.S. PATENT DOCUMENTS

| | | | |
|---|---|---|---|
| 7,619,341 B2 * | 11/2009 | Ishida ..................... | 310/156.08 |
| 7,750,523 B2 * | 7/2010 | Nakayama et al. ...... | 310/156.53 |
| 2009/0045689 A1 * | 2/2009 | Haruno et al. ........... | 310/156.56 |

FOREIGN PATENT DOCUMENTS

| | | |
|---|---|---|
| JP | A-2005-184968 | 7/2005 |
| JP | A-2006-197693 | 7/2006 |
| JP | A-2006-314152 | 11/2006 |
| JP | A-2007-49805 | 2/2007 |
| JP | A-2007-252014 | 9/2007 |

* cited by examiner

*Primary Examiner* — Nguyen N Hanh
(74) *Attorney, Agent, or Firm* — Oliff & Berridge, PLC

(57) ABSTRACT

A rotor includes: a rotor core formed by stacking a first sheet member and a second sheet member and having a first magnet-inserted hole and a second magnet-inserted hole located radially outward relative to the first magnet-inserted hole; magnets inserted respectively into the first and second magnet-inserted holes; and a resin portion injected into the first and second magnet-inserted holes. The first sheet member has a first hole and a second hole constituting the first and second magnet-inserted holes respectively. The second sheet member is located at at least one axial end of the rotor core and has a portion covering a part of the first hole.

9 Claims, 5 Drawing Sheets

ROTOR AND METHOD OF MANUFACTURING THE ROTOR AND ELECTRIC VEHICLE

TECHNICAL FIELD

The present invention relates to a rotor and a method of manufacturing the rotor as well as an electric vehicle, and particularly to a rotor included in a rotating electric machine and a method of manufacturing the rotor as well as an electric vehicle including the rotor.

BACKGROUND ART

Japanese Patent Laying-Open No. 2005-184968 (Patent Document 1) discloses a rotor having a rotor core constituted of a plurality of electromagnetic steel sheets. Here, among these electromagnetic steel sheets, at least one endmost steel sheet is a first steel sheet, and the remaining steel sheets are second steel sheets. The electromagnetic steel sheets each have a magnet hole provided to form a hole where a magnet is attached. The magnet hole in the first steel sheet is made smaller in size than the magnet hole in the second steel sheet.

When a magnet is to be embedded in the rotor core, the magnet is inserted into a magnet-inserted hole provided in the rotor core, and a filler is injected into the hole. The filler flows from above an axial end face of the rotor core into the hole. In the case where a plurality of magnets are embedded in the rotor core, a channel where the filler is carried to be fed into one magnet-inserted hole could be narrowed due to the presence of another magnet-inserted hole. Patent Document 1 discloses no structure or feature with which this problem can be solved.

DISCLOSURE OF THE INVENTION

An object of the present invention is to provide a rotor in which a channel where a filler is carried to be injected into a magnet-inserted hole can be easily secured, and a method of manufacturing the rotor, as well as an electric vehicle including the rotor.

A rotor according to the present invention includes: a rotor core formed of a plurality of sheet members stacked on each other, the rotor core having a first magnet-inserted hole and a second magnet-inserted hole located radially outward relative to the first magnet-inserted hole; magnets inserted into the first and second magnet-inserted holes, respectively; and a filling portion injected into the first and second magnet-inserted holes. The plurality of sheet members include a first sheet member having first and second holes constituting the first and second magnet-inserted holes, respectively, and a second sheet member located at at least one axial end of the rotor core and having a portion covering a part of the first hole.

In the above-described structure, the second sheet member located at an axial end of the rotor core covers a part of the first hole formed in the first sheet member, and thus a channel where a filler is carried to be fed into the second magnet-inserted hole located radially outward can be easily secured.

Regarding the rotor according to the present invention, "filling portion" refers to a portion intended to secure the magnet to the rotor core chiefly by filling the inside of the hole, and "filler" refers to a material constituting "filling portion."

Further, "located radially outward" herein includes the state where a part of the second magnet-inserted hole overlaps the first magnet-inserted hole in the radial direction of the rotor core.

According to an aspect, in the above-described rotor, the first hole includes two holes disposed in a substantially V-shaped arrangement such that a distance between the two holes increases in a radially outward direction of the rotor core, the second hole is provided at a position sandwiched between the two holes disposed in the substantially V-shaped arrangement, and the filling portion is injected from radially inside relative to the first hole into the first and second holes.

In the above-described structure, for the rotor having three magnets per pole, the channel where the filler is carried to be fed into the second magnet-inserted hole located radially outward can be easily secured.

In the above-described rotor, preferably the second sheet member covers an axial end portion of the two holes, the axial end portion being located at a bottom of the substantially V-shaped arrangement.

In the above-described structure, a channel where the filler is carried to be fed into the second magnet-inserted hole can be easily secured at the bottom portion of the substantially V-shaped arrangement.

Regarding the above-described rotor, preferably the first sheet member has a third hole different from the first and second holes, and the second sheet member has a portion covering at least a part of the third hole.

In the above-described structure, the third hole is provided in the first sheet member and thus the weight of the rotor core can be reduced. Here, the second sheet member covers the third hole and thus a channel where the filler is carried to be fed into the magnet-inserted hole can be easily secured while the weight of the rotor core is reduced.

By way of example, the filling portion of the above-described rotor includes resin.

According to the present invention, a method of manufacturing a rotor includes the steps of: forming a first sheet member having first and second holes constituting a first magnet-inserted hole and a second magnet-inserted hole located radially outward relative to the first magnet-inserted hole, respectively, and forming a second sheet member having a portion covering a part of the first hole when laid on the first sheet member; stacking the first sheet members; inserting magnets respectively into the first and second magnet-inserted holes formed in a stack of the first sheet members; laying the second sheet member on the stack of the first sheet members with the magnets inserted in the stack; and forming a filling portion by injecting a filler into the first and second magnet-inserted holes from above the second sheet member.

According to the above-described method, the first sheet member located at an axial end of the rotor core covers a part of the first hole constituting the first magnet-inserted hole, and thus a channel where the filler is carried to be fed into the second magnet-inserted hole located radially outward can be easily secured.

In an aspect, according to the above-described method of manufacturing a rotor core, the filler flows from radially inside relative to the first magnet-inserted hole in the second sheet member toward the second magnet-inserted hole.

Accordingly, the area of the axial end face of the rotor core extended by the second sheet member can be effectively used.

An electric vehicle according to the present invention includes the above-described rotor, or the rotor manufactured according to the above-described method of manufacturing a rotor.

According to the present invention as described above, a rotor in which a channel where a filler is carried to be injected into the magnet-inserted hole can be easily secured and a method of manufacturing the rotor can be achieved.

It should be noted that two or more of the above-described features may be appropriately combined.

BEST MODES FOR CARRYING OUT THE INVENTION

Figure 1:
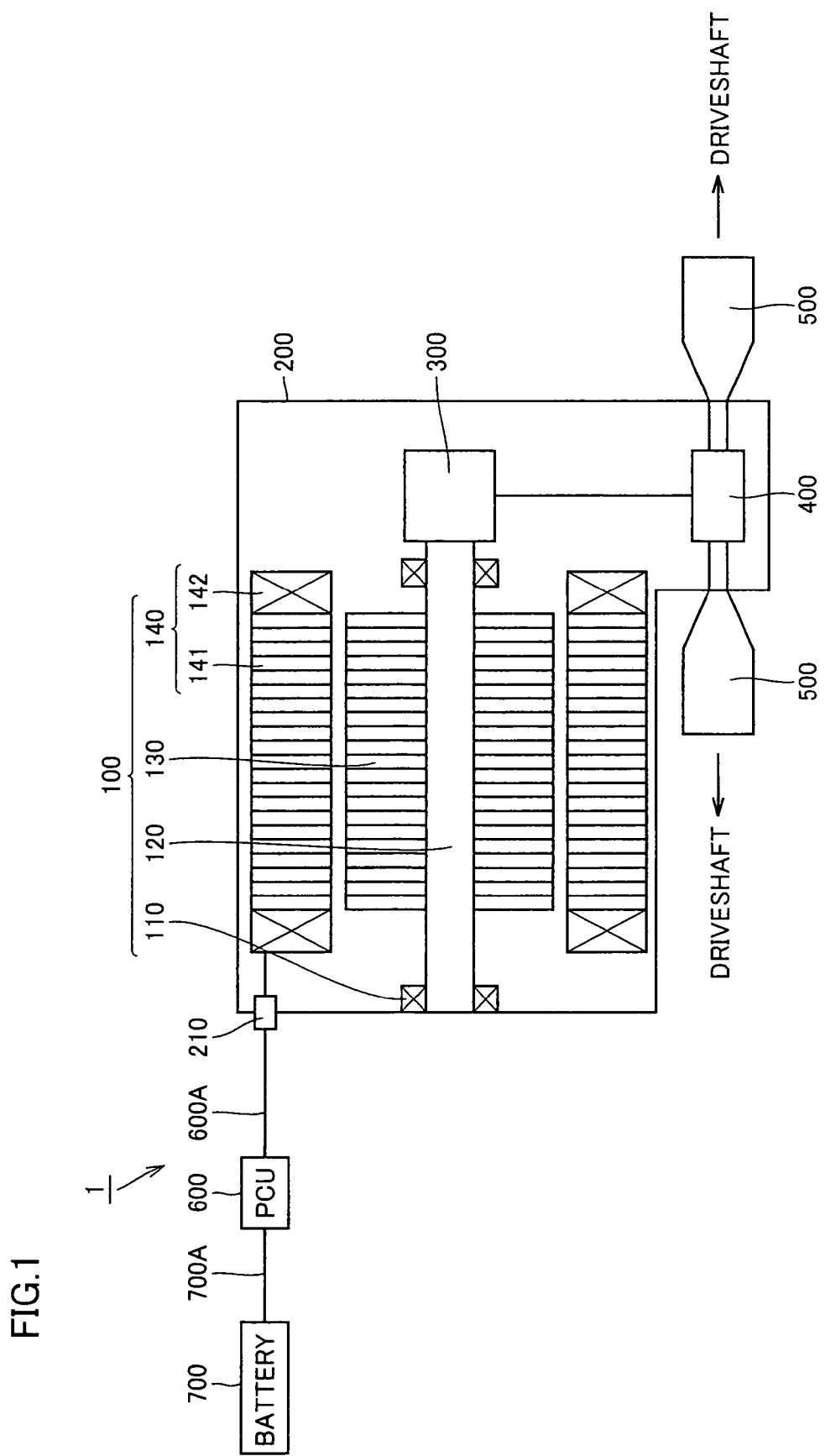
FIG. 1 is a diagram schematically showing a structure of a drive unit to which a rotor is applied according to an embodiment of the present invention.

In the following, embodiments of the present invention will be described. Here, like or corresponding components are denoted by like reference characters and a description thereof may not be repeated in some cases.

Regarding the embodiments described below, in the case where reference is made to the number of pieces, amount or the like, the scope of the present invention is not necessarily limited to the number, amount or the like unless otherwise specified. Further, in the following embodiments, each component is not necessarily a requisite component of the present invention unless otherwise specified. Furthermore, in the case where a plurality of embodiments are provided below, it is originally intended that some features of the embodiments may be appropriately combined unless otherwise specified.

FIG. 1 is a diagram schematically showing a structure of a drive unit to which a rotor is applied according to an embodiment of the present invention. In the example shown in FIG. 1, drive unit 1 refers to a drive unit mounted on a hybrid vehicle that is "electric vehicle" and is configured to include a motor generator 100, a housing 200, a reduction mechanism 300, a differential mechanism 400, and a driveshaft receiving portion 500.

Motor generator 100 is a rotating electric machine having the function of an electric motor or electric generator, and includes a rotational shaft 120 rotatably attached to housing 200 via a bearing 110, a rotor 130 attached to rotational shaft 120, and a stator 140. Stator 140 includes a stator core 141, and a coil 142 is wound around stator core 141. Coil 142 is electrically connected to a feed cable 600A via a terminal block 210 provided to housing 200. Feed cable 600A has another end connected to a PCU 600. PCU 600 is electrically connected to a battery 700 via a feed cable 700A. Accordingly, battery 700 and coil 142 are electrically connected.

The motive energy that is output from motor generator 100 is transmitted from reduction mechanism 300 via differential mechanism 400 to driveshaft receiving portion 500. The drive force transmitted to driveshaft receiving portion 500 is transmitted in the form of a rotational force via a driveshaft (not shown) to wheels (not shown) to cause the vehicle to run.

In contrast, when the hybrid vehicle is regeneratively braked, the wheels are rotated by an inertial force of the vehicle body. The rotational force from the wheels drives motor generator 100 via driveshaft receiving portion 500, differential mechanism 400 and reduction mechanism 300. At this time, motor generator 100 operates as an electric generator. The electric power generated by motor generator 100 is stored in battery 700 via an inverter in PCU 600.

Feed cables 600A, 700A are each a three-phase cable formed of a U phase cable, a V phase cable and a W phase cable. Coil 142 is formed of a U phase coil, a V phase coil and a W phase coil, and respective terminals of these three coils are connected to feed cables 600A, 700A that are each the three-phase cable.

The use of motor generator 100 is not limited to a hybrid vehicle (HV) and may be mounted on other "electric vehicles" (such as fuel cell vehicle and electric car for example).

Figure 2:
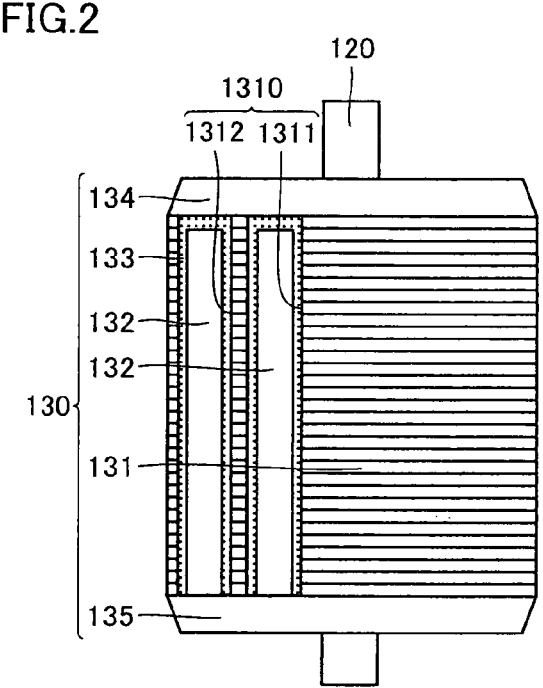
FIG. 2 is a longitudinal cross section showing a rotor according to an embodiment of the present invention.

FIG. 2 is a longitudinal cross section of rotor 130. Referring to FIG. 2, rotor 130 includes a rotor core 131 fixedly attached to rotational shaft 120 and having a magnet-inserted hole 1310 for inserting a magnet therein, a magnet 132 inserted into magnet-inserted hole 1310 to be embedded in rotor core 131, a resin portion 133 filling a clearance between the side surface of magnet-inserted hole 1310 and magnet 132, and end plates 134, 135 provided on axial end surfaces respectively of rotor core 131.

Resin portion 133 that is "molded resin portion" is formed including an epoxy-based resin for example. Resin portion 133 is provided and accordingly magnet 132 is secured to rotor core 131. Resin portion 133 secures magnet 132 to rotor core 131 chiefly by filling the inside of magnet-inserted hole 1310. In this way, magnet 132 can be precisely fixed in magnet-inserted hole 1310.

Magnet-inserted hole 1310 includes a first magnet-inserted hole 1311 and a second magnet-inserted hole 1312 located radially outward of rotor core 131 relative to first magnet-inserted hole 1311. In first and second magnet-inserted holes 1311, 1312, magnets 132 are inserted respectively.

First and second magnet-inserted holes 1311, 1312 will be described in more detail with reference to FIGS. 3 and 4. Rotor core 131 of rotor 130 in the present embodiment is formed by stacking a plurality of electromagnetic steel sheets on each other. In rotor core 131, an electromagnetic steel sheet located at a position other than the axial ends and an electromagnetic steel sheet located at an axial end have respective magnet-inserted holes with respective shapes different from each other.

Figure 3:
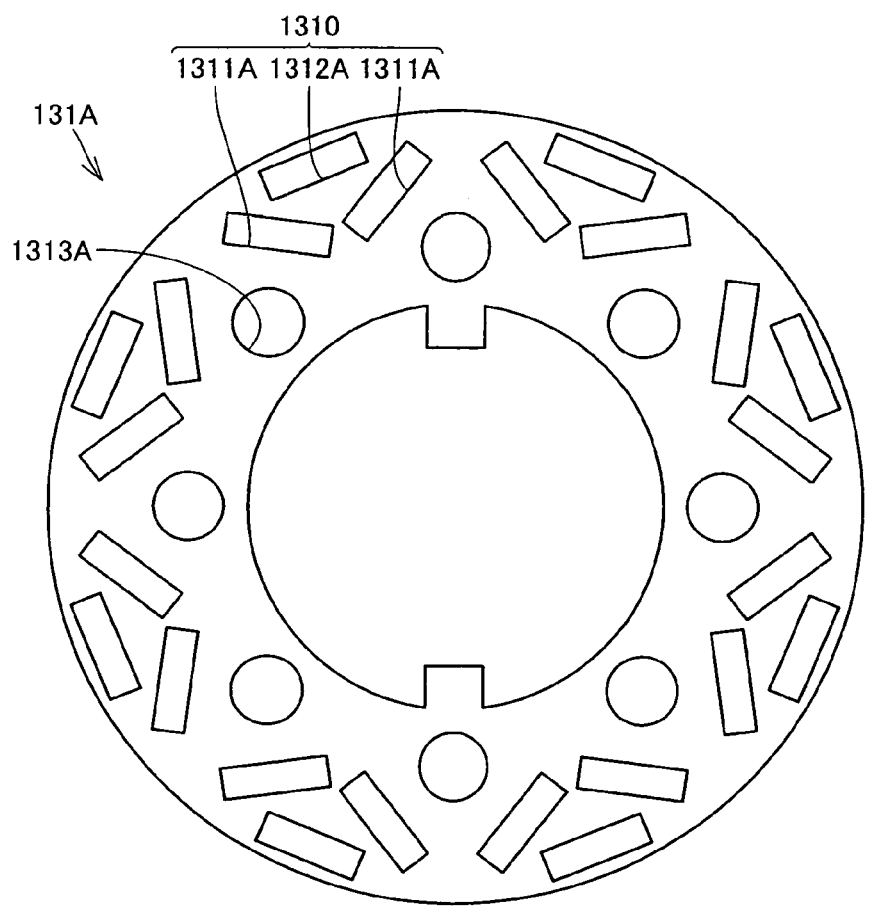
FIG. 3 is a diagram showing a first electromagnetic steel sheet that is a constituent of a rotor according to an embodiment of the present invention.

FIG. 3 is a diagram showing a first sheet member 131A that is an electromagnetic steel sheet located at a position other than the axial ends of rotor core 131. Referring to FIG. 3, first sheet member 131A includes first and second holes 1311A, 1312A constituting magnet-inserted hole 1310, and a third hole 1313A for reducing the weight of rotor core 131. More specifically, first hole 1311A is constituted of two holes disposed in a substantially V-shaped arrangement. Second hole 1312A is provided radially outward of rotor core 131 relative to first hole 1311A in such a manner that second hole 1312A is sandwiched between first holes 1311A disposed in a substantially V-shaped arrangement. Second hole 1312A is formed in such a manner that a part of the second hole overlaps first holes 1311A in the radial direction of rotor core 131. Eight sets of first and second holes 1311A, 1312A are arranged in the circumferential direction of rotor core 131. In other words, rotor 130 is an eight-pole rotor having three magnets inserted per pole. As for third hole 1313A, a plurality of (eight) third holes 1313A are formed in such a manner that each third hole is located between two poles.

Figure 4:
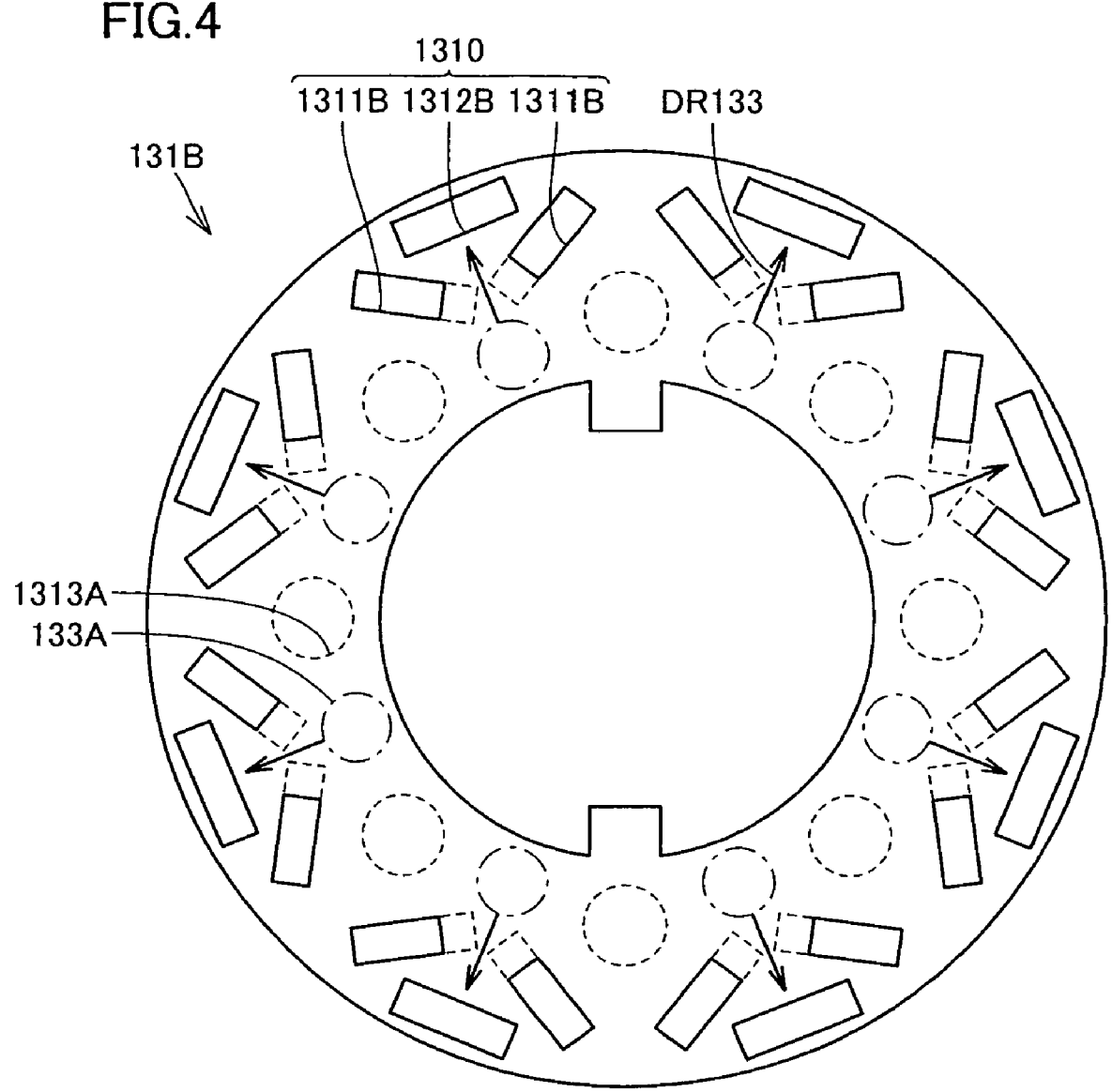
FIG. 4 is a diagram showing a second electromagnetic steel sheet that is a constituent of a rotor according to an embodiment of the present invention.

FIG. 4 is a diagram showing second sheet member 131B that is an electromagnetic steel sheet located at an axial end of rotor core 131. Second sheet members 131B may be located at the two opposing ends, respectively, of rotor core 131, or second sheet member 131B may be located at one axial end only. Further, only one second sheet member 131B, or two or more second sheet members 131B laid on each other may be provided at an axial end of rotor core 131.

Referring to FIG. 4, second sheet member 131B includes first and second holes 1311B, 1312B constituting magnet-inserted hole 1310. More specifically, first and second holes 1311B, 1312B are formed at respective positions corresponding to respective positions of first and second holes 1311A, 1311B formed in first sheet member 131A.

Second sheet member 131B does not have third hole 1313A as formed in first sheet member 131A. First hole 1311B formed in second sheet member 131B is smaller in size than first hole 1311A formed in first sheet member 131A (in FIG. 4, respective shapes of first holes 1311A and third hole 1313A formed in first sheet member 131A are indicated by broken lines for convenience of description). In other words, a part of second sheet member 131B covers first holes 1311A and third hole 1313A formed in first sheet member 131A. More specifically, second sheet member 131B is formed to cover a radially inside axial end portion of first hole 1311A formed in first sheet member 131A and cover the whole of third hole 1313A formed in first sheet member 131A. Second sheet member 131B may be formed to cover a different portion of first hole 1311A formed in first sheet member 131A, and/or cover only a part of third hole 1313A formed in first sheet member 131A.

In an actual process of forming rotor core 131, first sheet members 131A are stacked, and magnets 132 are inserted into first and second holes 1311A, 1312A, respectively. Second sheet member 131B is thereafter laid on the first sheet members. Then, a resin pot that is a material for resin portion 133 is disposed on second sheet member 131B, and a resin material is caused to flow into magnet-inserted hole 1310 by a resin seal apparatus described hereinlater. In FIG. 4, the position where this resin pot 133A is provided is drawn by a dashed-dotted line. As shown in FIG. 4, for each magnet-inserted hole 1310 constituting each pole, resin pot 133A is provided radially inward of rotor core 131 relative to hole 1310. Here, from resin pot 133A to second hole 1312B constituting second magnet-inserted hole 1312, the resin material flows in the direction of arrow DR133. Since first holes 1311B on second sheet member 131B are formed relatively smaller so that a part of first holes 1311A formed in first sheet member 131A is covered. Thus, a relatively large channel is secured for the resin material carried from resin pot 133A toward second hole 1311B.

Figure 5:
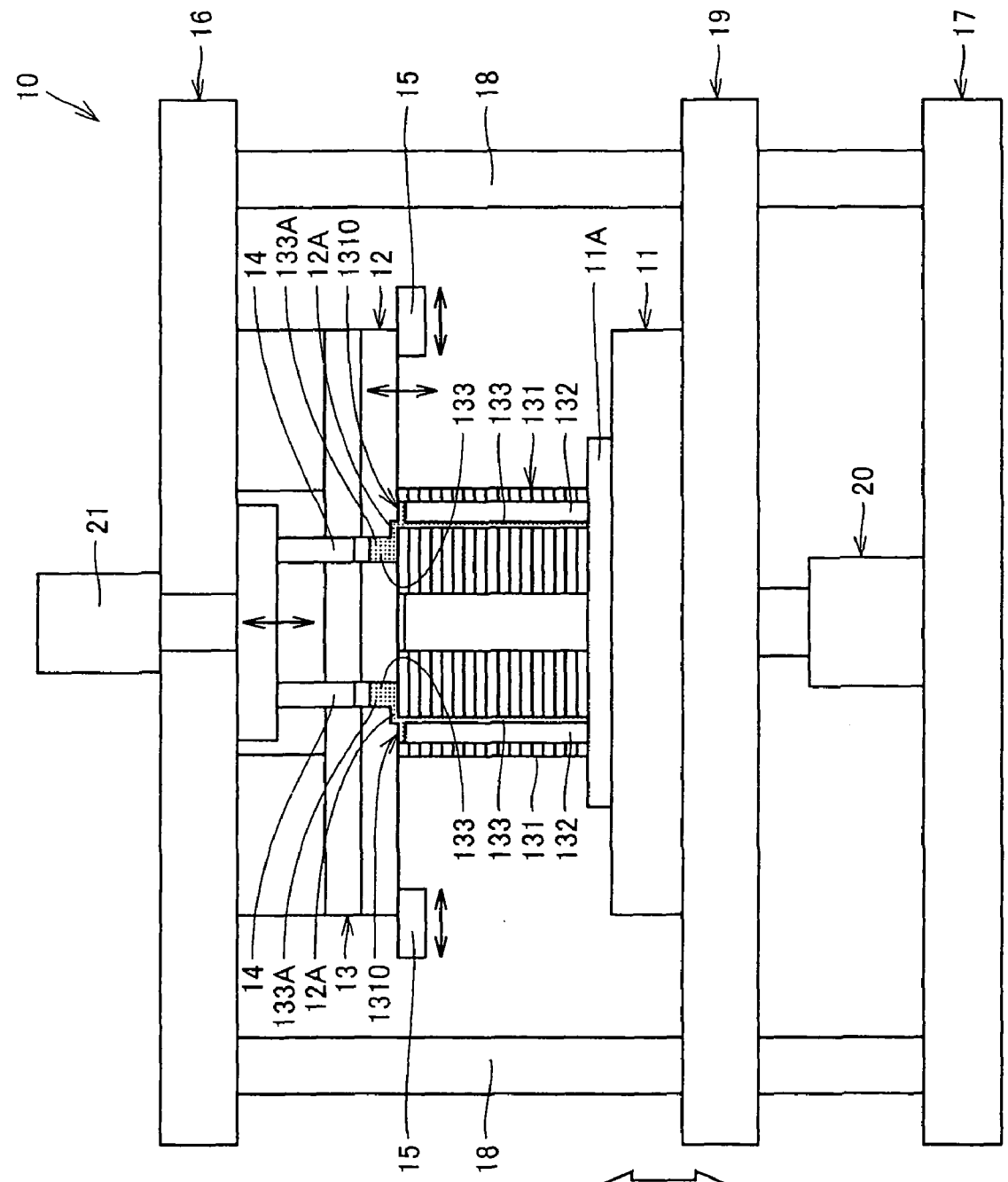
FIG. 5 is a diagram showing a resin seal apparatus for forming a resin portion of a rotor according to an embodiment of the present invention.

FIG. 5 is a diagram showing a resin seal apparatus for forming resin portion 133 in rotor 130. Referring to FIG. 5, resin seal apparatus 10 is configured to include a lower mold 11 on which a carry tray 11A with rotor core 131 placed thereon is mounted and which is configured to be capable of ascending and descending, and an upper mold 12 placed on rotor core 131 and configured to ascend as lower mold 11 ascends. Upper mold 12 includes, in a region located radially inward relative to magnet-inserted hole 1310 of rotor core 131, a plurality of resin pots 133A containing a material (referred to as tablet in some cases) for resin portion 133, and includes, in its bottom portion, a resin path 12A (referred to as runner in some cases) directing a molten liquid resin material to magnet-inserted hole 1310. Resin seal apparatus 10 further includes a fixed base 13 fixedly placed so that a gap serving as a working space for inserting a resin material forming resin portion 133 is formed relative to upper mold 12 located at its lower limit position, a plurality of plungers 14 passing through fixed base 13 for pressurizing the resin material fed into resin pot 133A of ascended upper mold 12, and a stopper 15 holding ascending upper mold 12 at its upper limit position. Fixed base 13 is attached to an upper fixed plate 16, while lower mold 11 is mounted on an ascending/descending plate 19 that moves up and down along four guide posts 18 coupling upper fixed plate 16 and a lower fixed plate 17. In fixed base 13, heating means (not shown) is provided to heat plunger 14 in advance and thereby facilitate extrusion of the resin material, and nullify a difference in thermal expansion between fixed base 13 and upper mold 12 and thereby eliminate displacement of the abutment between plunger 14 and resin pot 133A. Ascending/descending plate 19 is configured to be ascended and descended by a lower mold ascending/descending means 20 (jack for example) provided to lower fixed plate 17. A plurality of plungers 14 inserted into respective resin pots 133A are configured to ascend and descend in resin pot 133A at the same timing by plunger drive means 21 provided to upper fixed plate 16.

Regarding the rotor according to the present embodiment, a part of first hole 1311A formed in first sheet member 131A is covered with second sheet member 131B located at an axial end of rotor core 131, and thus a channel where the resin material is carried to be supplied to second magnet-inserted hole 1312 located radially outward can be easily secured. More specifically, in the bottom portion of the substantially V-shaped arrangement of two first magnet-inserted holes 1311, the channel where the resin material is carried to be fed to second magnet-inserted hole 1312 can be easily secured.

Further, third hole 1313A is provided in first sheet member 131A, and thus the weight of rotor core 131 can be reduced. Here, second sheet member 131B covers third hole 1313A, and thus the channel for supplying the resin material to magnet-inserted hole 1310 can be easily secured while the weight of rotor core 131 is reduced.

A summary of the above-described structure is as follows. A rotor according to the present embodiment includes: rotor core 131 formed of first sheet member 131A and second sheet member 131B corresponding to a plurality of "sheet members" stacked on each other, the rotor core having first magnet-inserted hole 1311 and second magnet-inserted hole 1312 located radially outward relative to first magnet-inserted hole 1311; magnets 132 inserted into the first and second magnet-inserted holes 1311, 1312, respectively; and resin portion 133 corresponding to "filling portion" injected into first and second magnet-inserted holes 1311, 1312. First sheet member 131A has first and second holes 1311A, 1312A constituting first and second magnet-inserted holes 1311, 1312, respectively. Second sheet member 131B is located at at least one axial end of rotor core 131 and has a portion covering a part of first hole 1311A.

First hole 1311A includes two holes disposed in a substantially V-shaped arrangement such that the distance between the two holes increases in a radially outward direction of rotor core 131. Second hole 1312A is provided at a position sandwiched between the two holes disposed in the substantially V-shaped arrangement. Resin portion 133 is injected from radially inside relative to first hole 1311A into first and second holes 1311A, 1312A. Second sheet member 131B has a portion covering an axial end portion of the two holes, the axial end portion being located at a bottom of the substantially V-shaped arrangement.

First sheet member 131A has third hole 1313A different from first and second holes 1311A, 1312A, and second sheet member 131B has a portion covering at least a part of third hole 1313A.

Figure 6:
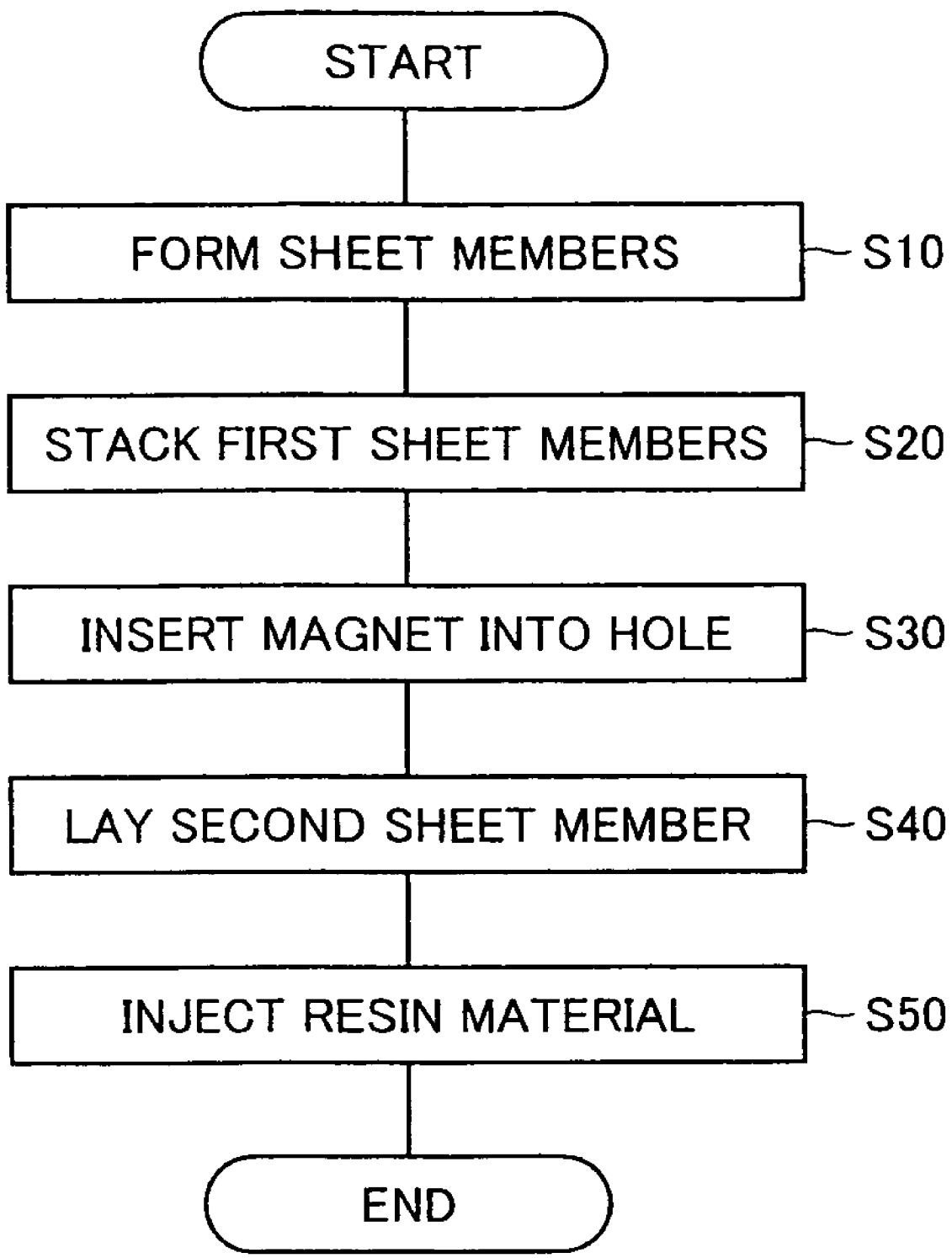
FIG. 6 is a flowchart illustrating a method of manufacturing a rotor according to an embodiment of the present invention.

A method of manufacturing a rotor according to the present embodiment as shown in FIG. 6 includes the steps of: forming first sheet member 131A having first and second holes 1311A, 1312A constituting first magnet-inserted hole 1311 and second magnet-inserted hole 1312 located radially outward relative to first magnet-inserted hole 1311, respectively, and forming second sheet member 131B having a portion covering a part of first hole 1311A when laid on first sheet member 131A (S10); stacking first sheet members 131A (S20); inserting magnets 132 respectively into first and second magnet-inserted holes 1311, 1312 formed in a stack of first sheet members 131A (S30); laying second sheet member 131B on the stack of first sheet members 131A with magnets 132 inserted in the stack (S40); and forming resin portion 133 corresponding to "filling portion" by injecting a resin material corresponding to "filler" into first and second magnet-inserted holes 1311, 1312 from above second sheet member 131B (S50). Here, the resin material flows from radially inside of second sheet member 131B relative to first magnet-inserted hole 1311 toward second magnet-inserted hole 1312.

While a resin material is used as "filler" in the above-described example of the present embodiment, an adhesive, instead of the resin material, may be used as "filler" as well.

Embodiments of the present invention have been described. It should be construed that the embodiments disclosed herein are given by way of illustration in all respects, not by way of limitation. It is intended that the scope of the present invention is defined by claims, and includes all modifications and variations equivalent in meaning and scope to the claims.

INDUSTRIAL APPLICABILITY

The present invention is applicable, for example, to a rotor included in a rotating electric machine, a method of manufacturing the rotor, and an electric vehicle including the rotor.

The invention claimed is:

1. A rotor comprising:
a rotor core formed of a plurality of sheet members stacked on each other, said rotor core having a first magnet-inserted hole and a second magnet-inserted hole located radially outward relative to said first magnet-inserted hole;
magnets inserted into said first and second magnet-inserted holes, respectively; and
a filling portion injected into said first and second magnet-inserted holes,
said plurality of sheet members including
a first sheet member having first and second holes constituting said first and second magnet-inserted holes, respectively, and
a second sheet member located at at least one axial end of said rotor core and having a portion covering a part of said first hole.

2. The rotor according to claim 1, wherein
said first hole includes two holes disposed in a substantially V-shaped arrangement such that a distance between the two holes increases in a radially outward direction of said rotor core,
said second hole is provided at a position sandwiched between said two holes disposed in the substantially V-shaped arrangement, and
said filling portion is injected from radially inside relative to said first hole into said first and second holes.

3. The rotor according to claim 2, wherein
said second sheet member covers an axial end portion of said two holes, said axial end portion being located at a bottom of said substantially V-shaped arrangement.

4. The rotor according to claim 1, wherein
said first sheet member has a third hole different from said first and second holes, and
said second sheet member has a portion covering at least a part of said third hole.

5. The rotor according to claim 1, wherein
said filling portion includes resin.

6. An electric vehicle including a rotor as recited in claim 1.

7. A method of manufacturing a rotor comprising the steps of:
forming a first sheet member having first and second holes constituting a first magnet-inserted hole and a second magnet-inserted hole located radially outward relative to said first magnet-inserted hole, respectively, and forming a second sheet member having a portion covering a part of said first hole when laid on said first sheet member;
stacking said first sheet members;
inserting magnets respectively into said first and second magnet-inserted holes formed in a stack of said first sheet members;
laying said second sheet member on the stack of said first sheet members with said magnets inserted in said stack; and
forming a filling portion by injecting a filler into said first and second magnet-inserted holes from above said second sheet member.

8. The method of manufacturing a rotor according to claim 7, wherein
said filler flows from radially inside relative to said first magnet-inserted hole in said second sheet member toward said second magnet-inserted hole.

9. An electric vehicle including a rotor manufactured according to a method of manufacturing a rotor as recited in claim 7.

* * * * *